United States Patent
Horibe et al.

(10) Patent No.: US 11,554,712 B2
(45) Date of Patent: Jan. 17, 2023

(54) VEHICLE LAMP UNIT INCLUDING SENSOR AND IRRADIATION DEVICE

(71) Applicant: TOYODA GOSEI CO., LTD., Kiyosu (JP)

(72) Inventors: Hitoshi Horibe, Kiyosu (JP); Masayuki Kitashiba, Kiyosu (JP); Yuhki Kuramitsu, Kiyosu (JP)

(73) Assignee: TOYODA GOSEI CO., LTD., Kiyosu (JP)

(*) Notice: Subject to any disclaimer, the term of this patent is extended or adjusted under 35 U.S.C. 154(b) by 0 days.

(21) Appl. No.: 17/359,807

(22) Filed: Jun. 28, 2021

(65) Prior Publication Data

US 2021/0402913 A1 Dec. 30, 2021

(30) Foreign Application Priority Data

Jun. 30, 2020 (JP) .............................. JP2020-113632
Jun. 3, 2021 (JP) .............................. JP2021-093631

(51) Int. Cl.
*B60Q 1/00* (2006.01)
*B60Q 1/26* (2006.01)
*B60Q 1/56* (2006.01)

(52) U.S. Cl.
CPC .......... *B60Q 1/0023* (2013.01); *B60Q 1/2669* (2013.01); *B60Q 1/56* (2013.01); *B60Q 2400/50* (2013.01)

(58) Field of Classification Search
CPC ...... B60Q 1/0023; B60Q 1/2669; B60Q 1/56; B60Q 2400/50

USPC ........................................ 362/497, 496, 501
See application file for complete search history.

(56) References Cited

U.S. PATENT DOCUMENTS

| 9,604,568 | B1* | 3/2017 | Salter | B60Q 1/22 |
| 9,688,189 | B1* | 6/2017 | Salter | B60R 13/10 |
| 2016/0001700 | A1* | 1/2016 | Salter | B60Q 1/24 362/510 |
| 2019/0176688 | A1* | 6/2019 | Yoon | B60Q 1/56 |
| 2020/0269751 | A1* | 8/2020 | Tatara | F21V 23/0478 |
| 2020/0386031 | A1* | 12/2020 | Tsunekawa | G06T 7/60 |

FOREIGN PATENT DOCUMENTS

| DE | 102019129398 A1 * | 5/2021 | B60Q 1/56 |
| JP | 2010-105426 A | 5/2010 | |
| JP | 2019-023428 A | 2/2019 | |
| JP | 2019-173508 A | 10/2019 | |

OTHER PUBLICATIONS

Search translation of DE 10 2019 129 398 A1. (Year: 2021).*

* cited by examiner

*Primary Examiner* — Laura K Tso
(74) *Attorney, Agent, or Firm* — McGinn I.P. Law Group, PLLC.

(57) ABSTRACT

Provided is a vehicle lamp unit that enables a user to perceive a detection range of a sensor. A vehicle lamp unit 1 includes: a sensor 4 mounted at a lower part of a vehicle 90; and an irradiation device 30 configured to irradiate a vehicle outer plate 95 present at a position corresponding to a detection range of the sensor 4.

19 Claims, 5 Drawing Sheets

VEHICLE LAMP UNIT INCLUDING SENSOR AND IRRADIATION DEVICE

TECHNICAL FIELD

The present invention relates to a vehicle lamp unit including a sensor and an irradiation device.

BACKGROUND ART

Conventionally, vehicles have been provided with various types of sensors. For example, Japanese Laid-Open Patent Publication No. 2019-23428 discloses a device configured to detect an action of a user standing near a sliding door by a sensor and open/close the sliding door on the basis of information detected by the sensor. With this device, the sliding door is opened/closed merely by the user performing a specific action, thus enabling the user to easily open the sliding door even when the user's hands are full, for example.

SUMMARY OF INVENTION

Technical Problem

Meanwhile, in this type of device, a sensor is generally provided at a part on a lower side of a vehicle, i.e., a lower part of the vehicle, in order to detect an action of an user's foot. Therefore, there is difficulty for the user to visually recognize the position of the sensor, thus causing a problem of difficulty in performing an appropriate action at an appropriate position. As a result, this type of device is likely to cause a problem that a door is not opened even though the user performs an action.

Besides, projection technology of displaying a position at which a user is to perform an action on a road surface is also proposed (Japanese Laid-Open Patent Publication No. 2019-173508). In this type of device, when the user performs an action at a position near a projection image displayed on a road surface, a sensor detects the user's action. This configuration is considered to reduce the problem that a door is not opened even though the user performs an action.

Meanwhile, for example, in a case where the road surface is brightly lit during the daytime or in a case of rainy weather, there is difficulty for the user to visually recognize the displayed projection image, and this still causes the problem that the door is not opened even though the user performs an action.

The inventor of the present invention has conceived of displaying, to a user, a position at which the user is to perform an action with respect to a sensor mounted on a vehicle, i.e., a detection range of the sensor, by using an irradiation device.

The present invention has been made in view of the above circumstances, and an object of the present invention is to provide a vehicle lamp unit that enables the user to perceive the detection range of the sensor.

Solution to Problem

In order to achieve the above object, a vehicle lamp unit according to the present invention includes: a sensor mounted at a lower part of a vehicle; and an irradiation device configured to irradiate a vehicle outer plate present at a position corresponding to a detection range of the sensor.

The vehicle lamp unit according to the present invention enables the user to easily perceive the detection range of the sensor.

DESCRIPTION OF EMBODIMENTS

A vehicle lamp unit of the present invention includes a sensor mounted at a lower part of a vehicle, and an irradiation device.

Since the sensor is mounted at the lower part of the vehicle, generally, there is difficulty for a user to visually recognize the sensor.

The irradiation device in the vehicle lamp unit of the present invention irradiates a vehicle outer plate present at a position corresponding to a detection range of the sensor. In other words, the irradiation device emits light toward the vehicle outer plate present at the above corresponding position and illuminates the vehicle outer plate. As used herein, being "present at a position corresponding to a detection range of the sensor" means that the position corresponding to the foot of the user who stands opposing the vehicle outer plate irradiated by the irradiation device is included in the detection range of the sensor.

If the position of the irradiation device and the position of the vehicle outer plate to be irradiated by the irradiation device are appropriately selected, a light sign obtained through irradiation by the irradiation device is easy for the user to visually recognize even under a sunny condition. Thus, the vehicle lamp unit of the present invention enables the user to easily perceive the detection range of the sensor.

In addition, an irradiation target of the irradiation device is a specific area on the specific vehicle outer plate. Therefore, in the vehicle lamp unit of the present invention, the quantity and the color of light emitted by the irradiation device are allowed to be selected so as to be appropriate for the vehicle outer plate. This also has an advantage of enabling the irradiation device to display a light sign that is easy for the user to visually recognize.

In addition, the distance from the irradiation device to the vehicle outer plate is shorter than the distance from the irradiation device to a road surface. Thus, the vehicle lamp unit of the present invention has an advantage in clearly displaying the light sign by the irradiation device.

Further, since the distance from the irradiation device to the vehicle outer plate is comparatively short, the light sign is clearly displayed even in a rainy or snowy condition, for example.

Also by these, the vehicle lamp unit of the present invention enables the user to easily perceive the detection range of the sensor.

Hereinafter, the vehicle lamp unit of the present invention will be described for constituent components thereof individually.

The vehicle lamp unit of the present invention includes the sensor and the irradiation device.

Of these, the sensor is not particularly limited as long as the sensor is mounted at the lower part of the vehicle. As the sensor, a so-called kick sensor for detecting an action of the user's foot is suitable. The sensor may be configured to detect the user's action by a known method, e.g., a capacitive method or an ultrasonic method.

The irradiation device may be any device that indicates the detection range of the sensor to the user by irradiating the vehicle outer plate. For example, the irradiation device may merely irradiate the vehicle outer plate with light, or may display a design such as a character or an image on the vehicle outer plate by light irradiation. The character or the image may be a still or planar one, or may be a moving or stereoscopic one such as a moving image or a hologram. The irradiation device may be integrated with the sensor or may be separate from the sensor.

In any of the above cases, the light sign is displayed on the vehicle outer plate through irradiation by the irradiation device. With the sign, the detection range of the sensor is indicated to the user.

The design displayed by the irradiation device may be, for example, a denotation or an image such as logo, symbol, or house mark in various types, or may be some message with characters.

The irradiation device may merely irradiate the vehicle outer plate, or may irradiate another area in addition to the vehicle outer plate. Here, the vehicle outer plate is a plate-shaped part, of the vehicle, located outside a vehicle compartment, e.g., a body, a bumper, a door, or various types of garnishes.

In a case where the sensor of the vehicle lamp unit of the present invention is a kick sensor, the vehicle outer plate is preferably located near a door that is opened/closed on the basis of a detection result of the kick sensor, and in particular, the vehicle outer plate is suitably located near a back door. In this case, examples of the vehicle outer plate include a rear bumper, a rear diffuser, a lower end of the back door, a back garnish, and another area of the body located downward of the back door, which are constituent components at the lower part of the vehicle.

The irradiation device may be provided at any position that allows irradiation of the vehicle outer plate, and the provided position of the irradiation device may be appropriately set in accordance with the position of the vehicle outer plate. For example, if the vehicle outer plate is any of the above-described constituent components at the lower part of the vehicle, the irradiation device is preferably provided at, of the back door, a part located upward of the lower end thereof.

The irradiation device may merely display a sign indicating the detection range of the sensor on the above-described vehicle outer plate by irradiation, or may further have another function.

For example, the irradiation device may irradiate a road surface in addition to the vehicle outer plate, to display a light sign also on the road surface. The light sign displayed on the road surface may be relevant to the sensor of the vehicle lamp unit of the present invention, or may be irrelevant to the sensor. The irradiation device may merely illuminate a road surface so as to allow the user to visually recognize an area around the feet, particularly in an environment with an insufficient light quantity such as during the night or in rain.

In a case where the light sign displayed on a road surface by the irradiation device is relevant to the sensor, for example, the sign displayed on the road surface may be a sign indicating the detection range of the sensor.

In this case, signs indicating the detection range of the sensor are respectively displayed at two places, i.e., the road surface and the vehicle outer plate which is present slightly upward of the road surface, thereby enabling the user to perceive the detection range of the sensor highly reliably. In this case, the detection range of the sensor is preferably set between the two signs.

In a case where the light sign displayed on a road surface by the irradiation device is irrelevant to the sensor, the sign displayed on the road surface may be a sign indicating, for example, whether or not abnormality has occurred during parking, whether or not there is a notice from a support center, time, a parking period, a future weather change, or the like.

The vehicle lamp unit of the present invention may include, in addition to the irradiation device, a license lamp configured to irradiate a license plate (also called number plate). In this case, the license lamp and the irradiation device may be regarded as an irradiation unit. The license lamp may be separate from the irradiation device or may be integrated with the irradiation device.

In these cases, the vehicle lamp unit of the present invention further has a function as the license lamp.

In a case where the license lamp is integrated with the irradiation device of the vehicle lamp unit of the present invention, some of parts functioning as the license lamp, e.g., a housing, a cover lens, and the like are preferably shared with the irradiation device. In this case, the irradiation device and the license lamp are downsized or the number of parts thereof is decreased, thus contributing to size reduction, weight reduction, cost reduction, and the like of the vehicle lamp unit of the present invention.

The irradiation device may be configured to emit visible light having a wavelength that is visually recognizable by the user, specifically, a wavelength of about 360 nm to 830 nm.

The wavelength of light emitted by the irradiation device is preferably such a wavelength that light reflected by the vehicle outer plate or a road surface is in a range of a blue-green color to a green color, i.e., 500 nm to 570 nm. Light in this range is excellent in visibility during the daytime. Therefore, if the reflected light from the vehicle outer plate is in this range, the light sign from the irradiation device is visually recognizable by the user highly reliably even during the daytime.

In a case where the irradiation device merely illuminates a road surface, light emitted by the irradiation device preferably has such a wavelength that light reflected by the road surface is white. Specifically, the light may be mixed light having two or more wavelengths in the above-described visible light range.

A light source of the irradiation device is not particularly limited as long as the light source emits visible light in the above range, and may be a halogen lamp or an LED lamp, for example.

The irradiation device may have one light source or a plurality of light sources. For example, in a case where the irradiation device irradiates a road surface in addition to the vehicle outer plate, the irradiation device may have a plurality of light sources for respectively irradiating these places independently of each other, or may irradiate the plurality of places by one light source.

In a case where the irradiation device has a plurality of light sources and irradiates a plurality of places, the irradiation device may have irradiation paths in a plurality of systems for irradiating the plurality of places.

The light quantity of the irradiation device is not particularly limited as long as a light sign bright enough for the user to visually recognize is displayed on the vehicle outer plate.

As a specific example, the light quantity of the irradiation device is preferably such a light quantity that the illuminance on the vehicle outer plate is in a range of 1000 lux to 30000 lux, a range of 1200 lux to 1800 lux, a range of 1350 lux to 1650 lux, or a range of 10000 lux to 20000 lux.

In a case where the irradiation device irradiates a road surface in addition to the vehicle outer plate, the light quantity of the irradiation device to irradiate the road surface is preferably such a light quantity that the illuminance on the road surface is in a range of 200 lux to 800 lux, a range of 300 lux to 700 lux, or a range of 400 lux to 600 lux. In a case of illuminating a road surface by the irradiation device under a condition such as during the night or in rain as described above, the light quantity of the irradiation device is preferably such a light quantity that the illuminance on the road surface is in a range of 5 lux to 300 lux, a range of 10 lux to 100 lux, or a range of 10 lux to 50 lux.

In a case where the vehicle lamp unit of the present invention includes the license lamp, the light color of a light source of the license lamp is preferably white.

The light quantity of the light source of the license lamp is preferably such a light quantity as to allow numbers to be visually recognized definitely even from a location about 20 m rearward of the vehicle. Specifically, the light quantity is preferably such a light quantity that the illuminance on the license plate is not less than 8 lux, and more preferably such a light quantity that the illuminance on the license plate is not less than 10 lux.

Further, in order to appropriately display the sign on the vehicle outer plate, a display portion suitable for displaying the light sign may be provided at, of the vehicle outer plate, a part to be irradiated by the irradiation device.

For example, if the display portion is formed in a matte-finished uneven shape, external light reflection and the like on the display portion are suppressed, whereby the light sign based on irradiation by the irradiation device is clearly displayed on the display portion. In this case, the vehicle lamp unit of the present invention may include the display portion in addition to the sensor and the irradiation device.

The timing of starting irradiation by the irradiation device may be set as appropriate in accordance with the shape or the specifications of the vehicle on which the vehicle lamp unit of the present invention is mounted, a usage condition by the user, or the like. For example, the irradiation device may start irradiation when the user having a smart key approaches to a distance of about 80 cm to 100 cm to the back door of the vehicle.

Also, the timing of stopping irradiation by the irradiation device may be set as appropriate, and for example, the irradiation may be stopped when the back door is opened. Further, in a case where the sensor has not detected the user's action even when a predetermined period has elapsed since the start of the irradiation, the irradiation by the irradiation device may be stopped. The predetermined period is preferably in a range of ten seconds to one minute, and for example, may be thirty seconds.

Besides, regarding a controller for controlling operation of the vehicle lamp unit of the present invention, an electronic control unit (ECU) of the vehicle may be used also as the controller, or a dedicated controller for the vehicle lamp unit of the present invention may be provided. The controller may be provided separately from the vehicle lamp unit of the present invention or may constitute a part of the vehicle lamp unit of the present invention.

Hereinafter, the vehicle lamp unit of the present invention will be described using a specific example.

Embodiment 1

A vehicle lamp unit according to embodiment 1 includes, as the sensor, a kick sensor, and includes an irradiation unit that functions also as a license lamp for irradiating a license plate.

Figure 1:
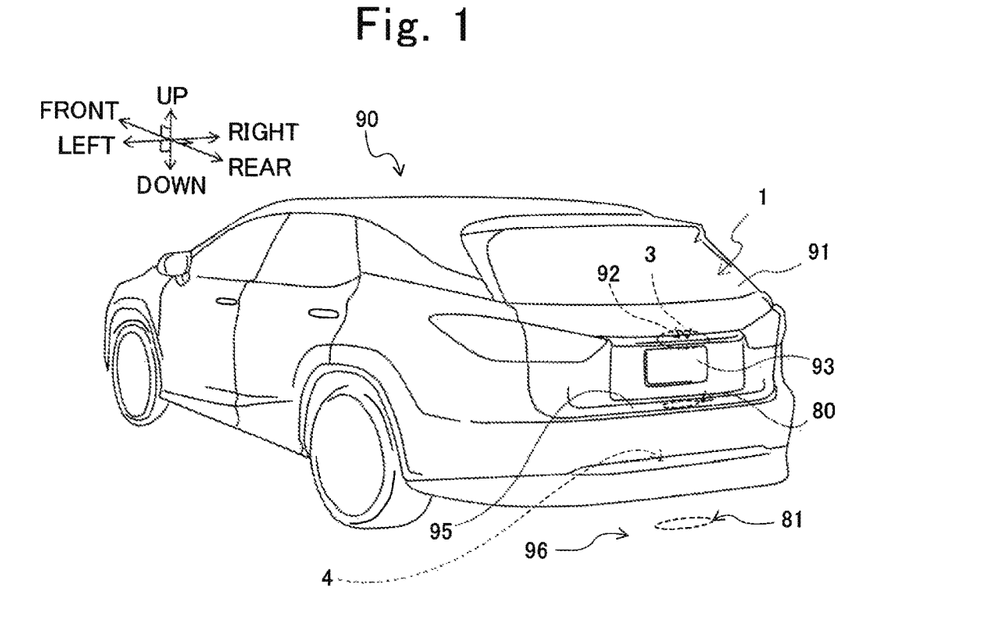
FIG. 1 schematically illustrates a state in which a vehicle lamp unit of embodiment 1 is mounted on a vehicle.
Figure 2:
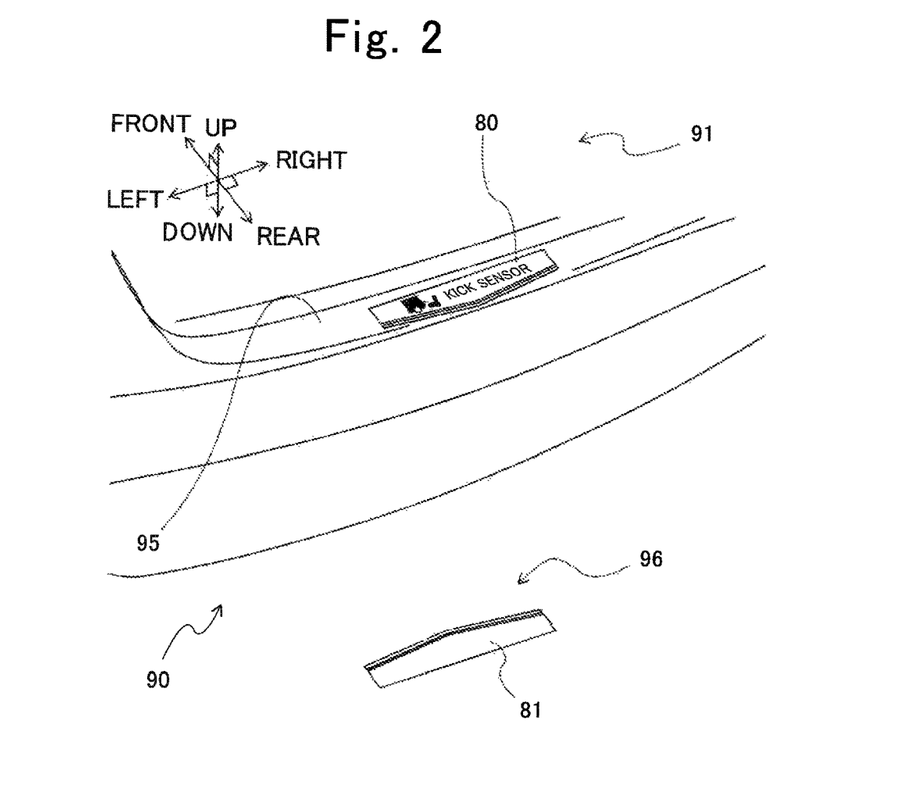
FIG. 2 schematically illustrates a sign emitted to a vehicle outer plate by an irradiation device of the vehicle lamp unit of embodiment 1.
Figure 3:
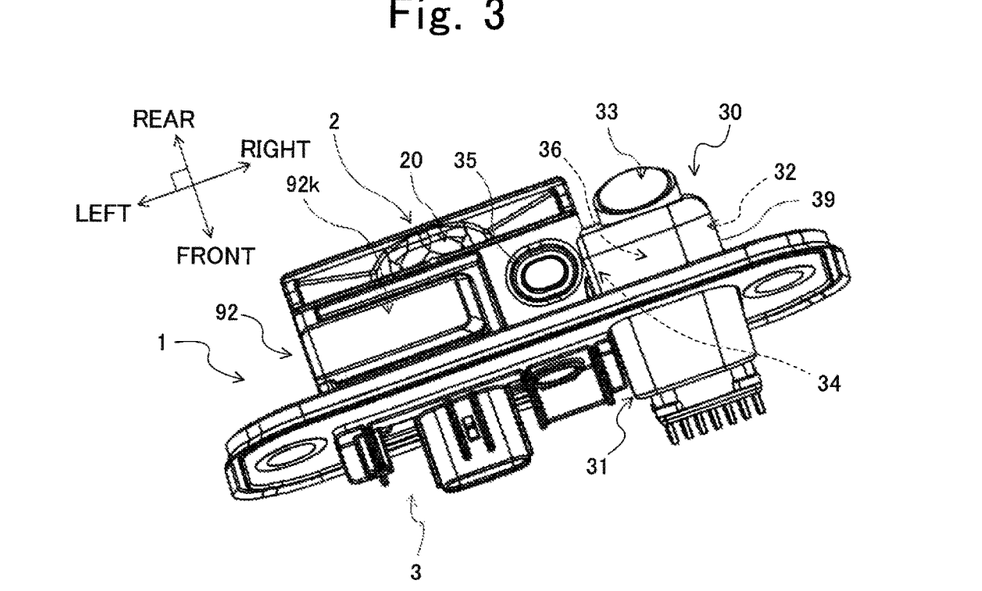
FIG. 3 schematically illustrates the vehicle lamp unit of embodiment 1.
Figure 4:
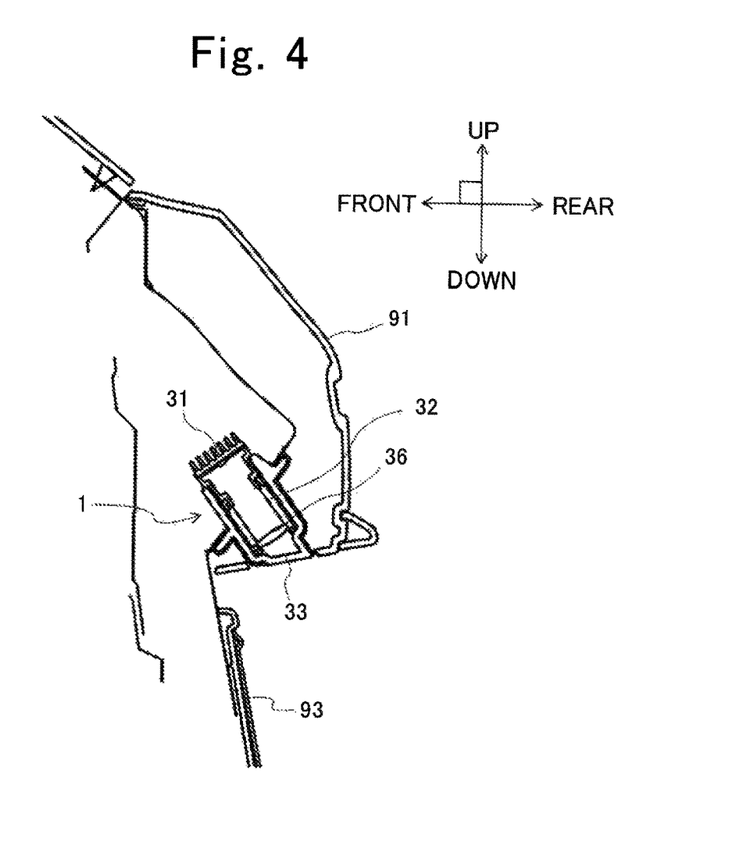
FIG. 4 schematically illustrates a cross-section passing the irradiation device in the vehicle lamp unit of embodiment 1.

FIG. 1 schematically illustrates a state in which the vehicle lamp unit of embodiment 1 is mounted on a vehicle, FIG. 2 schematically illustrates a sign emitted to a vehicle outer plate by an irradiation device of the vehicle lamp unit of embodiment 1, FIG. 3 schematically illustrates the vehicle lamp unit of embodiment 1, and FIG. 4 schematically illustrates a cross-section passing the irradiation device in the vehicle lamp unit of embodiment 1.

Hereinafter, up, down, left, right, front, and rear refer to up, down, left, right, front, and rear shown in the drawings. The up-down direction corresponds to the vertical direction, the front-rear direction corresponds to the vehicle advancing direction, and the left-right direction corresponds to the vehicle width direction.

A vehicle lamp unit 1 of embodiment 1 includes a kick sensor 4 and an irradiation unit 3. As shown in FIG. 1, the kick sensor 4 in the vehicle lamp unit 1 of embodiment 1 is mounted on the inner side of a rear bumper 95 of a vehicle 90.

The irradiation unit 3 is separate from the kick sensor 4. The irradiation unit 3 includes an irradiation device 30 and a license lamp 2 (see FIG. 3). The irradiation unit 3 is mounted inside a back door 91 of the vehicle 90 together with a handle mechanism 92 of the back door 91, and irradiates the rear bumper 95, a road surface 96, and a license plate 93. In the vehicle lamp unit 1 of embodiment 1, a vehicle outer plate is the rear bumper 95, and the irradiation device 30 also irradiates the road surface 96 in addition to the rear bumper 95. Besides, a lock switch 35 (see FIG. 3) for the back door 91 is integrated with the vehicle lamp unit 1 of embodiment 1.

The irradiation unit 3 in the vehicle lamp unit 1 of embodiment 1 is integrated with the handle mechanism 92 of the back door 91 of the vehicle 90. The handle mechanism 92 is mounted at a lower inside part of the back door 91 shown in FIG. 1. More specifically, the license plate 93 is provided at a lower part of the back door 91 and the vehicle lamp unit 1 is provided upward of the license plate 93 together with the handle mechanism 92 of the back door 91.

As shown in FIG. 3, the irradiation unit 3 includes the license lamp 2 and the irradiation device 30. The irradiation device 30 is provided adjacently at the right of the license lamp 2, and is integrated with the license lamp 2. The irradiation device 30 is provided inside a housing 39 which is also called an outer lens. The irradiation device 30 is provided with an irradiation housing 32, an LED lamp 31, a design lens 33, and a first lens 36.

The design lens 33 is provided integrally at a rear end part of the housing 39, and is located at the right side with respect to a knob 92k of the handle mechanism 92. The LED lamp 31 is stored in a front end part of the housing 39.

The irradiation device 30 irradiates both of an upper surface of the vehicle outer plate, i.e., the rear bumper 95, and the road surface 96, shown in FIG. 1, and displays signs (80, 81) described later, on both surfaces, respectively.

As shown in FIG. 4, the first lens 36 is located at a distal end of the irradiation housing 32, i.e., a rear lower end thereof, and is provided ahead in the irradiation direction of the LED lamp 31. The design lens 33 is provided further ahead in the irradiation direction of the first lens 36. A filter (not shown) is provided on the optical-path upstream side relative to the design lens 33. The filter has a mask portion (not shown) having a shape corresponding to the sign 80 to be displayed on the upper surface of the rear bumper 95 and a shape corresponding to the sign 81 to be displayed on the road surface 96. Thus, light emitted from the LED lamp 31 and passing through the filter exhibits the signs 80, 81 having predetermined designs, as shown in FIG. 2.

As shown in FIG. 3, the license lamp 2 is independent of the irradiation device 30, and is controlled independently of the irradiation device 30. Therefore, irradiation of the rear bumper and the road surface 96 by the irradiation unit 3, and irradiation of the license plate 93 by the license lamp 2, are each performed individually.

The vehicle lamp unit 1 of embodiment 1 is connected to an ECU (not shown) of the vehicle 90, and operation of the vehicle lamp unit 1 is controlled by the ECU.

Hereinafter, operation of the vehicle lamp unit 1 of embodiment 1 will be described.

When a user having a smart key approaches the stopped or parked vehicle 90, a key sensor (not shown) of the vehicle 90 detects the approach and the ECU starts the vehicle lamp unit 1.

Specifically, the LED lamp 31 is turned on and the irradiation device 30 emits light to the upper surface of the rear bumper 95 and the road surface 96. In addition, the kick sensor 4 starts sensing, i.e., transmission and reception of ultrasonic waves.

At this time, the LED lamp 31 of the vehicle lamp unit 1 of embodiment 1 lights up in a blue-green color. Therefore, the light emitted by the irradiation device 30 is easily visually recognized by the user even under a sunny condition.

Here, in the vehicle lamp unit 1 of embodiment 1, the focus of the irradiation device 30 is set on the upper surface of the rear bumper 95. Therefore, as shown in FIG. 2, a clear light sign including an arrow-shaped design and characters is displayed on the upper surface of the rear bumper 95, and the sign 81 which is slightly unclear as compared to the sign 80 displayed on the rear bumper 95 is displayed on the road surface 96. In the vehicle lamp unit 1 of embodiment 1, the sign 80 displayed on the upper surface of the rear bumper 95 and the sign 81 displayed on the road surface 96 have designs different from each other.

The detection range of the kick sensor 4 in the vehicle lamp unit 1 of embodiment 1 is present between the sign 80 displayed on the upper surface of the rear bumper 95 and the sign 81 displayed on the road surface 96.

Therefore, in order to open the back door 91, when the user performs an action of moving the foot below the sign 80 displayed on the rear bumper 95 and above the sign 81 displayed on the road surface 96, the kick sensor 4 detects this action. Then, on the basis of the detection result of the kick sensor 4, the ECU drives the back door 91 to open, so that the back door 91 is opened. In addition, at this time, the ECU stops light irradiation by the irradiation device 30 and sensing by the kick sensor 4.

Also in a case where the kick sensor 4 has not detected the user's action even when thirty seconds have elapsed since the start of the vehicle lamp unit 1 by the ECU, the ECU stops light irradiation by the irradiation device 30 and sensing by the kick sensor 4.

As described above, the vehicle lamp unit 1 of embodiment includes the license lamp 2. The license lamp 2 operates independently of the irradiation device 30 and the kick sensor 4.

Under an outside environment with a less light quantity, e.g., during the night, when an accessory switch (not shown) of the vehicle 90 is ON, the ECU starts the license lamp 2. At this time, the license lamp 2 irradiates the license plate 93 with white light.

In the vehicle lamp unit 1 of embodiment 1, the irradiation device 30 irradiates the upper surface of the rear bumper 95 which is the vehicle outer plate, to display the light sign 80. Thus, the user is enabled to easily visually recognize the detection range of the kick sensor 4, i.e., the position at which the user is to perform an action. That is, the vehicle lamp unit 1 of embodiment 1 enables the user to easily perceive the detection range of the kick sensor 4 and thus appropriately assists a user's operation to open the back door 91.

In addition, in the vehicle lamp unit 1 of embodiment 1, the irradiation device 30 irradiates the upper surface of the rear bumper 95 and the road surface 96, thereby displaying the light signs 80, 81 indicating the detection range of the kick sensor 4 on both surfaces, respectively. Thus, the user is enabled to easily recognize the detection range of the kick sensor 4.

Further, the vehicle lamp unit 1 of embodiment 1 includes the license lamp 2 in addition to the irradiation device 30 for irradiating the rear bumper 95 and the road surface 96 and displaying the signs 80, 81. The irradiation device 30 and the license lamp 2 are integrated with each other. Thus, the vehicle lamp unit 1 of embodiment 1 is reduced in size and weight and therefore is suitable as an on-vehicle lamp unit.

Embodiment 2

A vehicle lamp unit according to embodiment 2 is substantially the same as the vehicle lamp unit of embodiment 1 except for the structure of an irradiation unit. Therefore, the vehicle lamp unit of embodiment 2 will be described focusing on the difference from the vehicle lamp unit of embodiment 1.

Figure 5:
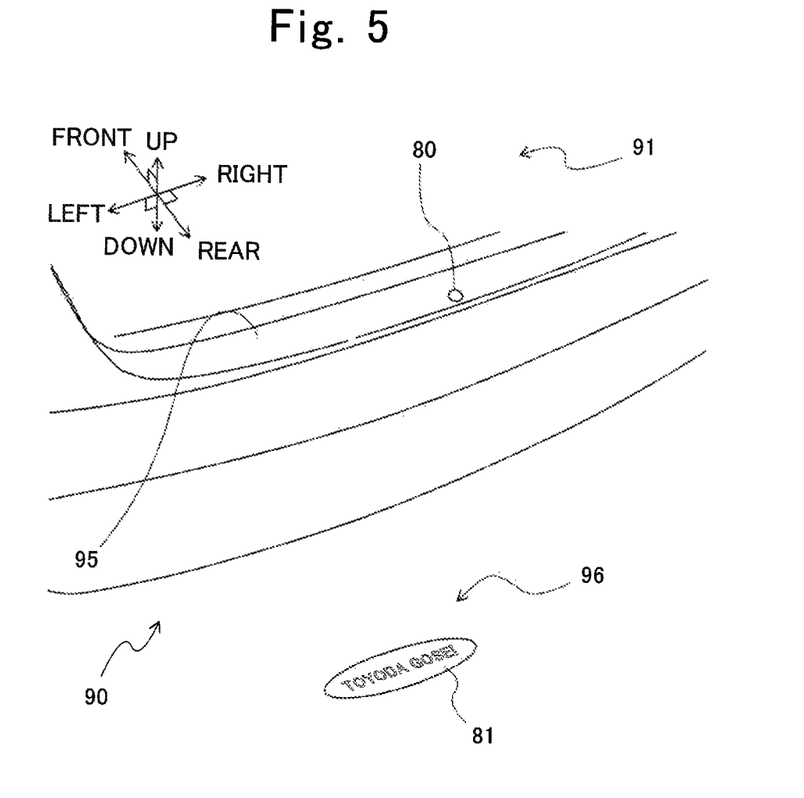
FIG. 5 schematically illustrates a sign emitted to a vehicle outer plate by an irradiation device of a vehicle lamp unit of embodiment 2.
Figure 6:
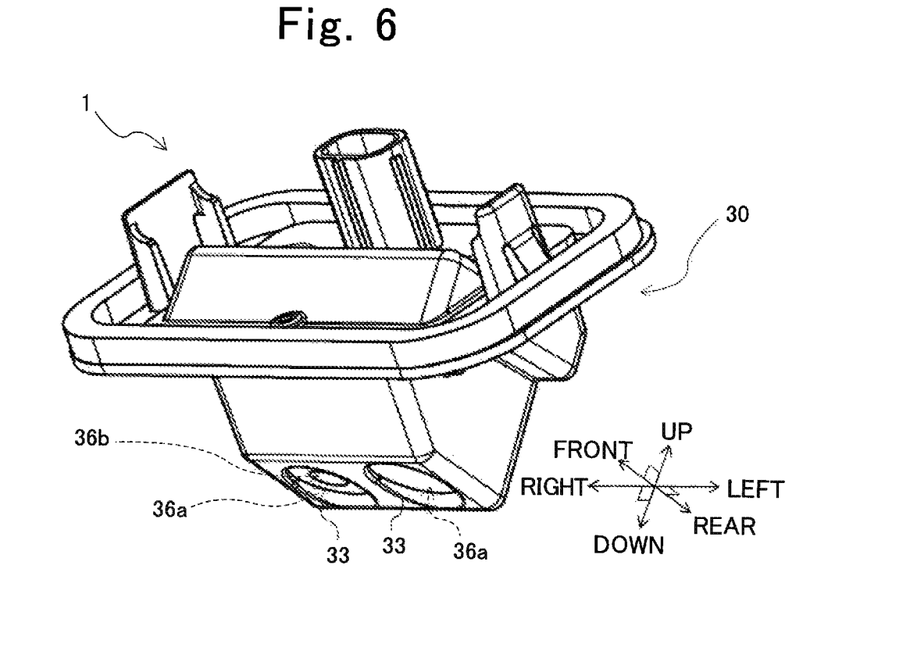
FIG. 6 schematically illustrates the vehicle lamp unit of embodiment 2.
Figure 7:
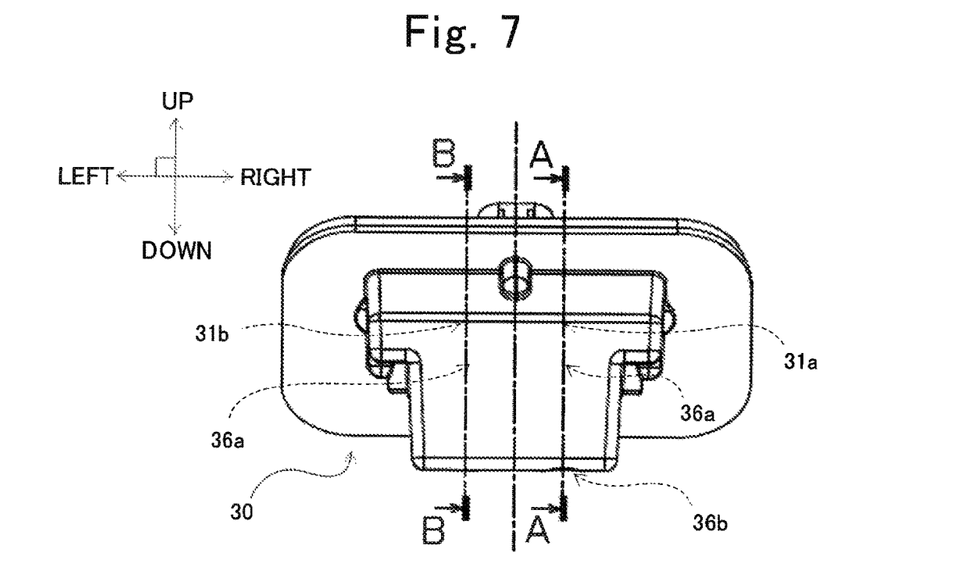
FIG. 7 schematically illustrates the vehicle lamp unit of embodiment 2.
Figure 8:
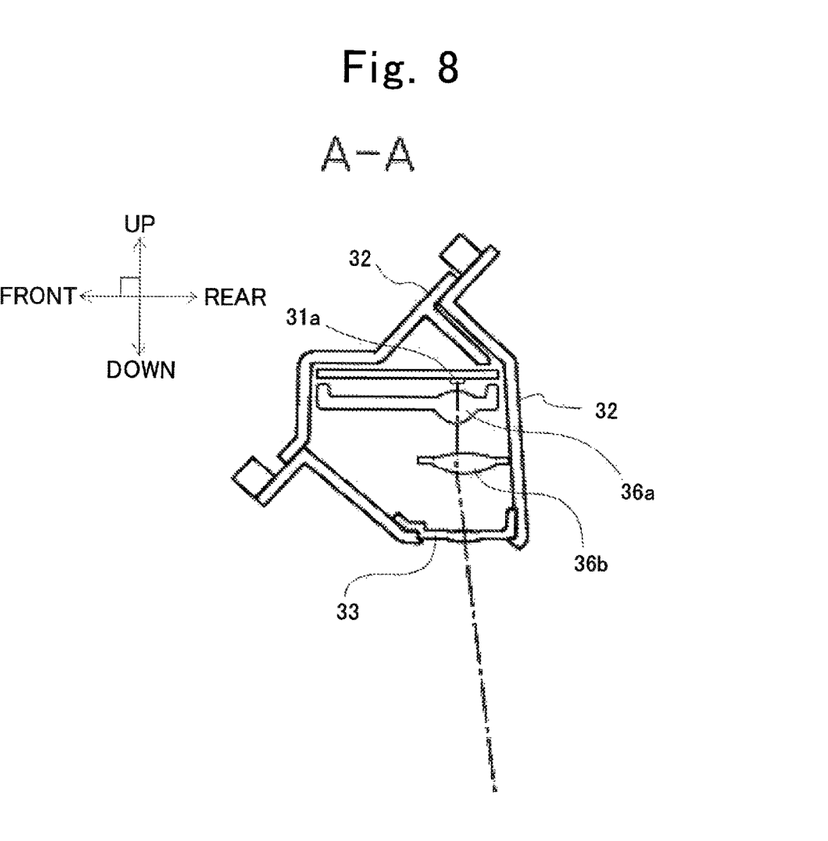
FIG. 8 schematically illustrates a cross-section passing the irradiation device in the vehicle lamp unit of embodiment 2.
Figure 9:
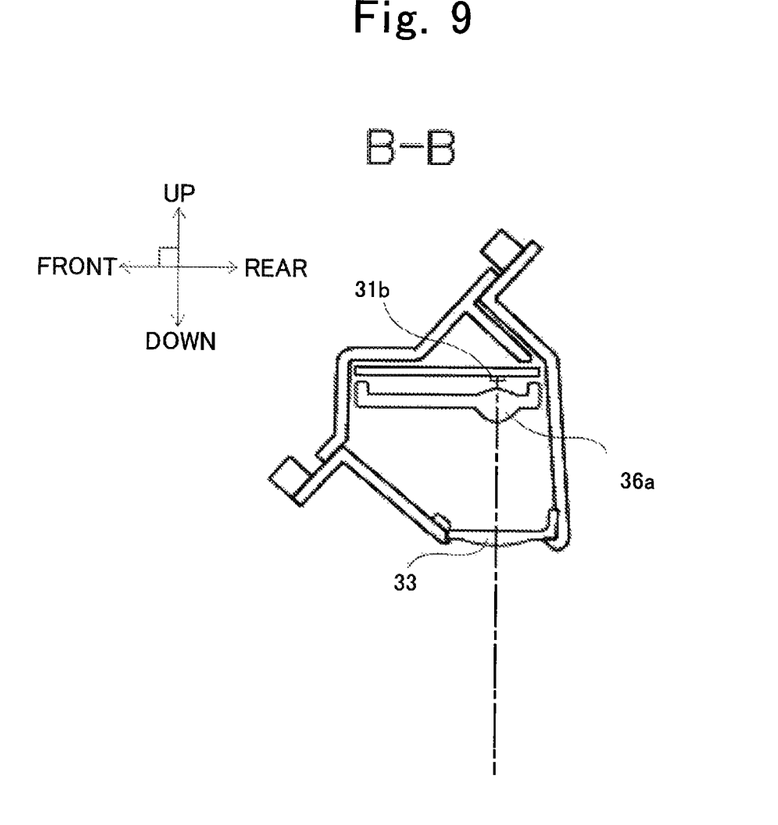
FIG. 9 schematically illustrates a cross-section passing the irradiation device in the vehicle lamp unit of embodiment 2.

FIG. 5 schematically illustrates a sign emitted to a vehicle outer plate by an irradiation device of the vehicle lamp unit of embodiment 2, FIG. 6 and FIG. 7 schematically illustrate the vehicle lamp unit of embodiment 2, and FIG. 8 and FIG. 9 schematically illustrate cross-sections passing the irradiation device in the vehicle lamp unit of embodiment 2. FIG. 8 shows a cross-section along line A-A in FIG. 7, and FIG. 9 shows a cross-section along line B-B in FIG. 7.

Hereinafter, up, down, left, right, front, and rear refer to up, down, left, right, front, and rear shown in the drawings. The up-down direction corresponds to the vertical direction, the front-rear direction corresponds to the vehicle advancing direction, and the left-right direction corresponds to the vehicle width direction.

An irradiation unit 3 of a vehicle lamp unit 1 of embodiment 2 is greatly different from the irradiation unit 3 of the vehicle lamp unit 1 of embodiment 1, particularly in an irradiation device 30.

As shown in FIG. 6 to FIG. 9, the irradiation device 30 of the vehicle lamp unit 1 of embodiment 2 is provided with two LED lamps, i.e., a first LED lamp 31a and a second LED lamp 31b, and two lenses, i.e., a first lens 36a and a second lens 36b.

As shown in FIG. 7 to FIG. 9, the first LED lamp 31a and the second LED lamp 31b are arranged at the right and the left. The first LED lamp 31a and the second LED lamp 31b emit white light.

As shown in FIG. 8 and FIG. 9, the first lens 36a is provided ahead in the irradiation directions of the first LED lamp 31a and the second LED lamp 31b. As shown in FIG. 7 and FIG. 8, the second lens 36b is provided ahead in the irradiation direction of only the first LED lamp 31a via the first lens 36a therebetween. That is, in the vehicle lamp unit 1 of embodiment 2, the irradiation device 30 has irradiation paths in two systems which are a system passing the first LED lamp 31a, the first lens 36a, and then the second lens 36b, and a system passing the second LED lamp 31b and then the first lens 36a. Of the irradiation paths in these two systems, the former one is referred to as first system and the latter one is referred to as second system.

As shown in FIG. 8, the irradiation path in the first system has two lenses, i.e., the first lens 36a and the second lens 36b. Thus, in the irradiation path in the first system, light from the LED lamp 31a is comparatively greatly refracted. Therefore, the irradiation path in the first system is considered suitable for irradiating a road surface 96 present at a position distant from the irradiation device 30 and displaying a sign 81 as shown in FIG. 5.

In embodiment 2, the light quantity of the first LED lamp 31a is such a light quantity that the illuminance on a road surface during the night is about 30 lux and allows an area around the user's feet to be illuminated. Although the sign 81 is displayed using the irradiation path in the first system in embodiment 2, the irradiation path in the first system may be used merely for illuminating the road surface 96.

As shown in FIG. 9, the irradiation path in the second system has one lens, i.e., the first lens 36a, and in the irradiation path in the second system, light from the second LED lamp 31b is not refracted so greatly. Therefore, the irradiation path in the second system is considered suitable for irradiating an upper surface of a rear bumper 95 present at a position near the irradiation device 30 and displaying a sign 80 as shown in FIG. 5.

As described above, the irradiation device 30 of the vehicle lamp unit 1 of embodiment 2 has the irradiation paths in two systems different in the number of lenses. Thus, the vehicle lamp unit 1 of embodiment 2 is considered suitable for irradiating, in addition to the upper surface of the vehicle outer plate, i.e., the rear bumper 95, a part (i.e., the road surface 96) whose position relative to the irradiation device 30 is different from the upper surface of the rear bumper 95.

The present invention is not limited to only the embodiment described above and shown in the drawings, but may be modified as appropriate without deviating from the scope of the present invention. In addition, the components shown in the description including the embodiment may be optionally taken out and combined with each other to carry out the present invention.

The invention claimed is:

1. A vehicle lamp unit, comprising:
a sensor mounted at a lower part of a vehicle; and
an irradiation device configured to irradiate a surface located at a position corresponding to a detection range of the sensor,
wherein the irradiation device includes irradiation paths in two systems different in a number of lenses.

2. The vehicle lamp unit according to claim 1, wherein the sensor includes a kick sensor.

3. The vehicle lamp unit according to claim 1, wherein the irradiation device is mounted on a back door of the vehicle.

4. The vehicle lamp unit according to claim 1, wherein the irradiation device irradiates a road surface in addition to the surface.

5. The vehicle lamp unit according to claim 1, further comprising a lamp configured to irradiate a license plate of the vehicle.

6. The vehicle lamp unit according to claim 1, wherein the irradiation device displays a design on the surface by irradiating the surface.

7. The vehicle lamp unit according to claim 1,
wherein the irradiation device includes a first LED lamp, a second LED lamp, a first lens adjacent the first LED lamp, and a second lens adjacent the second LED lamp, and
wherein the first LED lamp and the second LED lamp are arranged at first and second sides, respectively, of the irradiation device.

8. The vehicle lamp unit according to claim 1, wherein the irradiation device includes a first LED lamp, a second LED lamp, a first lens adjacent the first LED lamp, and a second lens adjacent the second LED lamp, and wherein the first lens is provided ahead in irradiation directions of the first LED lamp and the second LED lamp.

9. The vehicle lamp unit according to claim 1, wherein the irradiation device includes a first LED lamp, a second LED lamp, a first lens adjacent the first LED lamp, and a second lens adjacent the second LED lamp, and wherein the second lens is provided ahead in an irradiation direction of only the first LED lamp via the first lens therebetween.

10. The vehicle lamp unit according to claim 1, wherein the irradiation device includes a first LED lamp, a second LED lamp, a first lens adjacent the first LED lamp, and a second lens adjacent the second LED lamp, and wherein the irradiation device has irradiation paths in a plurality of systems, the plurality of systems comprising a first system passing through the first LED lamp, the first lens, and then the second lens, and a second system passing through the second LED lamp and then the first lens.

11. The vehicle lamp unit according to claim 10, wherein, in the irradiation path in the first system, light from the first LED lamp is comparatively greatly refracted as compared to light in the irradiation path in the second system.

12. The vehicle lamp unit according to claim 1, wherein the irradiation device irradiates, in addition to the surface, a part whose position relative to the irradiation device is different from the surface.

13. The vehicle lamp unit according to claim 1, wherein the surface comprises a surface of a plate-shaped part of the vehicle located outside of a vehicle compartment.

14. The vehicle lamp unit according to claim 1, wherein the irradiation device is integrated with a handle mechanism of a door of the vehicle.

15. The vehicle lamp unit according to claim 1, wherein the irradiation device is configured to start irradiating after a smart key approaches a predetermined distance from the vehicle.

16. The vehicle lamp unit according to claim 1, wherein the sensor is mounted on an inner side of a bumper of the vehicle.

17. The vehicle lamp unit according to claim 1, wherein the irradiation device is integrated with the sensor.

18. A vehicle lamp unit, comprising:
a sensor mounted on a vehicle;
an irradiation device configured to irradiate a surface located at a position corresponding to a detection range of the sensor,
wherein the irradiation device is enclosed in a housing that includes a handle mechanism of a door of the vehicle,
wherein the irradiation device includes a first lens adjacent a first LED lamp and a second LED lamp,
wherein the first lens is provided ahead in irradiation directions of the first LED lamp and the second LED lamp and,
wherein the irradiation device includes irradiation paths in two systems different in a number of lenses.

19. The vehicle lamp unit according to claim 18, wherein the irradiation device further includes a second lens adjacent the second LED lamp.

* * * * *